United States Patent
Reynhout

(10) Patent No.: US 6,749,678 B1
(45) Date of Patent: Jun. 15, 2004

(54) SOLID-STATE COMPOSITION COMPRISING SOLID PARTICLES AND BINDER

(75) Inventor: Marinus Johannes Reynhout, Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/890,726

(22) PCT Filed: Feb. 28, 2000

(86) PCT No.: PCT/EP00/00734

§ 371 (c)(1), (2), (4) Date: Aug. 1, 2001

(87) PCT Pub. No.: WO00/46164

PCT Pub. Date: Aug. 10, 2000

(30) Foreign Application Priority Data

Feb. 2, 1999 (EP) .............................. 99300739

(51) Int. Cl.⁷ ............................................ C09D 195/00
(52) U.S. Cl. .................................... 106/281.1
(58) Field of Search ..................... 106/281.1

(56) References Cited

U.S. PATENT DOCUMENTS

| | | | | |
|---|---|---|---|---|
| 3,415,669 A | * | 12/1968 | Elste, Jr. ..................... | 427/135 |
| 4,371,401 A | * | 2/1983 | Langumier ............. | 106/284.01 |
| 4,961,837 A | | 10/1990 | Velasco et al. ................ | 208/41 |
| 5,759,250 A | * | 6/1998 | Malot et al. .............. | 106/281.1 |

FOREIGN PATENT DOCUMENTS

| | | | |
|---|---|---|---|
| EP | 0 246 956 | 11/1987 | .......... C10G/21/00 |
| GB | 1 432 644 | 4/1976 | .......... C08L/95/00 |
| JP | 61-89215 | 7/1994 | ............ H04N/5/45 |
| SU | 808 438 | 2/1981 | .......... C04B/13/24 |
| WO | 91 15625 | 10/1991 | ............ D06N/7/00 |
| WO | 98 05492 | 2/1998 | ............. B32B/5/16 |

OTHER PUBLICATIONS

Kirk–Othmer Encyclopedia of Chemical Technology 3rd Edition, vol. 4, p. 557 no date provided.
Kirk–Othmer Encyclopedia of Chemical Technology 3rd Edition, vol. 6, p. 213 no date provided.

* cited by examiner

Primary Examiner—David Brunsman

(57) ABSTRACT

Solid-state composition having a flexural strength of at least 0.5 N/mm², which composition comprises from solid particles and a hydrocarbonaceous binder containing (i) from 15 to 95% by weight, based on total binder, of asphaltenes, which asphaltenes contain at least 60% aromatic carbon, and (ii) from 5 to 85% by weight, based on total binder, of further hydrocarbons, with the proviso that the solid particles are not solely carbon particles; process for preparing such composition, use of such composition in construction, construction element containing such composition and construction containing such construction elements.

10 Claims, No Drawings

SOLID-STATE COMPOSITION COMPRISING SOLID PARTICLES AND BINDER

This is a 371 filing of PCT/EP00/00734.

FIELD OF THE INVENTION

The present invention relates to solid-state compositions comprising solid particles and a hydrocarbonaceous binder. Further, the present invention relates to a process for preparing such composition, to the use of such composition in construction, to a construction element containing such composition, and to a construction containing such construction elements.

BACKGROUND OF THE INVENTION

It is known to mix carbon particles such as petroleum coke, carbon black or anthracite coal with binder materials such as coal tar pitch and petroleum pitch, forming these mixtures by molding or extrusion and baking the mixtures in furnaces at temperatures from 800–1400° C. (Kirk-Othmer Encyclopedia of Chemical Technology $3^{rd}$ edition, volume 4, page 557).

U.S. Pat. No. 4,961,837 describes a specific petroleum pitch for binding carbon black to manufacture electrodes for the aluminium and steel industries, which petroleum pitch has been obtained by pre-heating a feedstock, feeding the pre-heated feedstock to a soaker so as to promote condensation and polymerisation, and separating off a petroleum tar pitch of a quality suitable for use as a binder in the manufacture of electrodes.

The teaching of both documents is limited to the use of these binders with carbon particles.

U.S. Pat. No. 5,759,250 describes the use of a very hard bitumen binder for road bed foundations. The bitumen preferably is a blend of bitumen obtained from a hard base produced by direct distillation and having a penetrability from 15 to 25 and a heavy fraction obtained by distillation of crude petroleum or of products obtained by a process such as catalytic or thermal cracking. It is stated that these bitumen binders can only be used in road bed foundation layers because they do not have sufficient adherence properties and asphalt prepared from it does not present a closed, smooth surface without holes and roughness. Further, it is described that these foundation layers must be covered by a top layer to ensure good thermal protection.

Surprisingly, we have now found binders which can be hard while having good adhesion properties.

Japanese laid open patent application No. 61-89215 describes a method for selectively separating high molecular weight polycyclic aromatic polymer from residual oil produced by thermal cracking of naphtha. The polymer is described to be suitable as an auxiliary material for moulding sand to overcome the disadvantages of existing quartz powder.

The best model of the bonding action in moulding sand is that of a wedge-and-block bond at the interface of the particles. The bonding action is not that of a glue or adhesive causing the particles to adhere to each other (Kirk-Othmer Encyclopedia of Chemical Technology $3^{rd}$ edition, volume 6, page 213). Therefore, the flexural strength of a moulding sand approaches 0 N/mm². The compositions according to the present invention differ from moulding sands in that the compositions according to the present invention have a flexural strength of at least 0.5 N/mm².

SUMMARY OF THE INVENTION

The solid-state compositions according to the present invention have a flexural strength of at least 0.5 N/mm² and comprise from 70 to 99% by weight of solid particles and from 30 to 1% by weight of a hydrocarbonaceous binder, which binder contains (i) from 15 to 95% by weight, based on total binder, of asphaltenes, which asphaltenes contain at least 60% aromatic carbon, and (ii) from 5 to 85% by weight, based on total binder, of further hydrocarbons, with the proviso that the solid particles are not solely carbon particles.

The amounts of solid particles and hydrocarbonaceous binder are based on amount of total composition.

Hydrocarbonaceous binders according to the present invention, are generally considered waste products. They are usually thought unsuitable for any attractive application other than as anode binder material or as part of fuel oil.

Surprisingly, compositions according to the present invention were observed to have good flexural strength. Further, compositions according to the present invention were observed to retain their flexural strength relatively well after exposure to water optionally containing salt and/or acid.

It was further found that compositions according to the present invention could be made harder by keeping them at elevated temperature either by a dedicated heat treatment or by keeping them at elevated temperature during manufacture and/or hot storage. Furthermore, it was found that this increased the flexural strength of compositions.

The flexural strength is measured according to NEN 7014, "Nederlands Normalisatie Instituut", $2^{nd}$ edition, August, 1974.

The amount of asphaltenes in the hydrocarbonaceous binder is determined according IP 143/96.

The percentage of aromatic carbon atoms present in the asphaltenes is measured by separating off the asphaltenes in the binder as described in IP 143/96, dissolving a sample of the asphaltenes in carbon disulphide or chloroform and assessing the percentage of aromatic carbon by H and $^{13}$CNMR.

The present invention further relates to a process for preparing a composition according to the present invention, which process comprises mixing from 70 to 99% by weight of solid particles and from 30 to 1% by weight of molten hydrocarbonaceous binder and allowing the resulting mixture to solidify, which binder contains (i) from 15 to 95% by weight, based on total binder, of asphaltenes, which asphaltenes contain at least 60% aromatic carbon, and (ii) from 5 to 85% by weight, based on total binder, of further hydrocarbons, with the proviso that the solid particles are not solely carbon particles.

The present invention further relates to the use of a composition according to the invention in construction, to a construction element containing such composition and to a construction containing such construction elements.

DETAILED DESCRIPTION OF THE INVENTION

The solid-state composition according to the present invention comprises hydrocarbonaceous binder which contains from 15 to 95% by weight, based on total binder, of asphaltenes as determined according IP 143/96. The asphaltenes comprise hydrogen, carbon and optionally other atoms. Specifically, the asphaltenes can contain up to 15% by weight of atoms other than hydrogen and carbon, more specifically sulphur, nitrogen and oxygen, preferably at most 12% by weight, most preferably at most 10% by weight, based on asphaltenes.

The hydrocarbonaceous binder comprises from 5 to 85% by weight of further hydrocarbons. The further hydrocarbons are compounds other than asphaltenes as determined according IP 143/96. The further hydrocarbons comprise hydrogen, carbon and optionally other atoms. Generally, the further hydrocarbons can contain up to 15% by weight of atoms other than hydrogen and carbon, more specifically sulphur, nitrogen and oxygen, preferably at most 12% by weight, most preferably at most 10% by weight, based on further hydrocarbons.

Preferably, the binder contains at least 20% by weight of asphaltenes, based on total binder. More preferably, the hydrocarbonaceous binder contains at least 25% by weight of asphaltenes. The amount of asphaltenes is up to 95% by weight, preferably up to 70% by weight, more preferably up to 60% by weight, more preferably up to 50% by weight, more preferably up to 45% by weight, most preferably at most 40% by weight. The remainder of the hydrocarbonaceous binder is further hydrocarbons.

The hydrocarbonaceous binder does not solely consist of carbon as produced after full carbonization, e.g. by heat treating of a coal tar or thermally cracked residual fraction.

Coal tar pitch differs from the present hydrocarbonaceous binder in that coal tar pitch contains a limited amount of asphaltenes. The amount of asphaltenes in coal tar pitch typically is less than 10% by weight. Furthermore, coal tar pitch contains substantial amounts of hazardous polyaromatic compounds containing 4 or 5 aromatic rings. The binder of the present invention will generally contain a very limited amount of polyaromatic compounds containing 4 or 5 aromatic rings. Generally, the binder of the present invention will contain less than 2% by weight of hazardous polyaromatic compounds containing 4 or 5 aromatic rings, more specifically less than 1% by weight, more specifically less than 0.5% by weight. The amount of these polyaromatic compounds is based on amount of binder and is measured by high-resolution gas chromatography as described in the article by J. Blomberg et al., Journal of Chromatography A, 849 (1999), pages 483–494.

The hydrocarbonaceous binder is present in an amount of from 1 to 30% by weight. Preferably, the hydrocarbonaceous binder is present in an amount of at least 2% by weight, more preferably in an amount of at least 3% by weight, most preferably at least 4% by weight. Preferably, the hydrocarbonaceous binder is present in an amount of up to 15% by weight, more preferably up to 10% by weight, most preferably up to 8% by weight.

The hydrocarbonaceous binder is desirably a binder which is solid at 20° C. and below. Generally, the hydrocarbonaceous binder will have a visco-elastic behaviour which is such that its penetration can be measured according to ASTM D 5 at 25° C. Preferably, the hydrocarbonaceous binder has a penetration of at most 30 dmm at 25° C., more preferably at most 20, more preferably at most 15, more preferably at most 10 dmm, most preferably less than 10 dmm. Further, the hydrocarbonaceous binder preferably has a penetration of at least 0.1 dmm at 25° C., more preferably at least 1 dmm, more preferably at least 2 dmm, most preferably at least 4 dmm.

The penetration values below 2 dmm can be measured by measuring at 40° C. and subsequently extrapolating the results.

The hydrocarbonaceous binder according to the present invention preferably has a softening point, measured according to the ring and ball test of ASTM D 36, of at most 160° C., more preferably at most 150° C., more preferably at most 120° C., most preferably at most 100° C.

The hydrocarbonaceous binder can be prepared in any way obvious to someone skilled in the art, provided that the binder obtained meets the requirements.

The hydrocarbonaceous binder can be prepared by subjecting hydrocarbons to thermal cracking. Preferably, a residual hydrocarbon fraction is subjected to thermal cracking. The thermally cracked product can be used as such, or in combination with any other hydrocarbon fraction as long as the requirements are met.

Preferably, the hydrocarbonaceous binder consists at least partly of product obtained by subjecting hydrocarbons to thermal cracking. Most preferably, the hydrocarbonaceous binder consists of product obtained by subjecting hydrocarbons to thermal cracking. Although in such case part of the thermally cracked product can be used, the binder only contains product which has been thermally cracked.

Thermal cracking is preferably carried out by pre-heating a hydrocarbon fraction to a temperature of from 350 to 500° C., maintaining the pre-heated oil at such conditions as to cause thermal cracking and subsequently separating off one or more light fractions. Thermal cracking of residual fractions usually involves a temperature of between 300 and 600° C. The pressure can be in the range from 1 to $100 \times 10^5$ $N/m^2$ (bar), preferably in the range from 2 to $20 \times 10^5$ $N/m^2$ (bar). Thermal cracking is preferably carried out in a soaker. The thermally cracked product as such can be used as binder, or the binder can be only a part of the thermally cracked product. In the latter case, the binder is separated from the thermally cracked product in any suitable way. Preferably, the binder is produced by separating off the light fractions by flash distillation, more preferably by vacuum flash distillation.

Another process by which the hydrocarbonaceous binder can be obtained comprises subjecting a residual fraction to hydroconversion at a temperature in the range from 200 to 450° C. and a pressure in the range from 50 to $200 \times 10^5$ $N/m^2$ (bar), optionally preceded by hydrodemetallization. Preferably, the hydroconversion is hydrodesulphurization.

Furthermore, the hydrocarbonaceous binder can be obtained by mixing different hydrocarbon fractions. An attractive method comprises mixing a composition containing solid particles and hydrocarbons, e.g. oil polluted soil or solids containing tar sands, with further hydrocarbons such that the final composition is a composition according to the present invention. The oil polluted soil is allowed to contain sand, stones and/or wood.

In principle, any suitable solid particles can be used in the composition of the present invention. The solid particles must be different from the hydrocarbonaceous binder. Further, the solid particles are not solely carbon particles.

A non-exhaustive list of solid particles which can be used comprises mineral particles, cement, concrete dust, recycled asphalt, recycled tyres, clay, old sand, porous particles such as zeolite and perlite, shells, crushed shells, spent catalyst, organic waste such as leaves and bones, fly-ash, rubber, polymers and wood particles such as chips, flakes and/or fibres and metal particles such as alumina. Solid particles which give especially good results are shells, mineral particles and/or wood particles.

Preferably, the solid particles comprise at least 5% by weight of inorganic compounds, which are compounds not containing carbon, based on amount of solid particles, preferably at least 10% by weight. Most preferably, the solid particles are inorganic compounds.

Preferably, the solid particles are a combination of particles having a particle size of at most 63 micrometers (so-called filler) and particles having a particle size in the range from 63 micrometers to 2 mm (so-called sand) and particles having a particle size in the range from 2 to 8 mm, preferably from 4 to 8 mm (so-called stones), optionally in combination with particles having larger sizes. The particle sizes are measured by sieving with sieves having openings of the indicated size. Preferably, the amount of each of filler, sand and stones is in the range from 10 to 50% by weight, (the combination to total 100% by weight) based on total amount of solid particles. Solid particles having a particle size of more than 8 mm are preferably present if larger objects are made.

Especially good results have been obtained with compositions comprising solid particles containing silica and/or alumina. It has been found that solid particles containing silica, give compositions of high flexural strength. Compositions containing solid particles containing alumina, were found having high compression strength. Preferably, the compositions comprise from 1 to 100% by weight of silica and/or alumina, based on amount of solid particles, more preferably from 1 to 100% by weight of silica, more preferably from 5 to 90% of silica, more preferably from 10 to 70% of silica.

It is especially preferred that the solid particles comprise quartz. Quartz consists of silica. Preferably, the compositions comprise from 20 to 95% by weight of quartz, based on amount of solid particles, more specifically from 30 to 90% by weight.

In order to make the composition electrically conductive, the composition can further contain electrically conductive solid particles, preferably graphite particles such as flakes or fibres. Preferably, the composition can comprise from 0 to 40% by weight of electrically conductive solid particles, based on total composition, more preferably from 5 to 20% by weight. By adjusting the amount of electrically conductive material in the composition, it is possible to make compositions ranging from electrically resistant compositions to electrically conductive compositions.

Further, the composition according to the present invention, can comprise magnetic materials such as iron particles. In this way, a magnetic composition can be obtained.

If the composition is to be used for heat insulation, the composition can contain solid particles increasing its heat insulation properties. If the composition is to be used for conducting heat, the composition can contain solid particles increasing its heat conductivity properties. If the composition is to be used for sound insulation or dampening, the composition can contain solid particles increasing its sound insulation and/or dampening properties.

If wood is present in the composition according to the present invention, the composition preferably comprises between 1 and 97% by weight of wood particles, based on total composition. The wood particles can be present in the form of treated or untreated fibres, chips, flakes and/or powder. Such compositions are especially suitable for making boards. Preferably, the composition comprises at least 5% by weight of wood particles, preferably fibres, based on total composition, more preferably at least 10% by weight. The composition preferably comprises at most 80% by weight of wood particles, preferably fibres, more preferably at most 70% by weight, based on total composition.

The composition of the present invention is solid at ambient temperature. The combination of solid particles and hydrocarbonaceous binder preferably becomes liquid at a temperature of 80° C. or more, more preferably 110° C. or more.

The compositions of the present invention have a flexural strength of at least 0.5 $N/mm^2$. A good flexural strength is advantageous when using the compositions in construction elements. Preferably, the flexural strength is at least 3 $N/mm^2$, more preferably at least 4 $N/mm^2$, more preferably at least 5 $N/mm^2$, most preferably at least 6 N/mm2. Flexural strength is measured according to NEN 7014, "Nederlands Normalisatie Instituut", $2^{nd}$ edition, August, 1974. For many applications low flexural strengths of at least 0.5 $N/mm^2$ suffice.

It has been found that good compression strengths can be obtained by using the composition of the present invention. This is advantageous when using the composition in construction elements. Compression strengths which can be obtained are 5 $N/mm^2$ or more, preferably 10 $N/mm^2$ or more, more specifically 15 $N/mm^2$ or more, measured according to ISO/R 836 of the European Federation of Manufacturers of Refractory Products as revised in 1990, PRE/R 14-1. The presence of graphite has been found to inrease the compression strength. However, for many applications such high compression strengths are not necessary.

The compositions according to the present invention preferably have a void content of at most 3%, more preferably at most 2.5%, most preferably at most 2.0%. The void content is determined according to the "Standaard Regelgeving Advisering Wegenbouw", 1995, test 67. However, for many applications such low void contents are not necessary. One of the applications where compositions according to the present invention can have a high void content, are low density compositions. These specific compositions have a density of at most 1000 $kg/m^3$.

It was observed that compositions according to the present invention could be made harder by keeping them at elevated temperature either by a dedicated heat treatment or by keeping them at elevated temperature during manufacture and/or hot storage. A test for this specific kind of hardening is RTFOT (ASTM D 2872). In some tests, the penetration of a composition according to the present invention was as low as 50% or less of the original penetration value. Further, it was observed that the flexural strength increased by the heat treatment.

The heat treatment can involve heating the compositions to a temperature of at least 70° C., preferably at least 100° C., more preferably at least 130° C., more preferably at least 150° C., more preferably at least 200° C. during at least 0.25 hour, more preferably at least 0.5 hour, more preferably at least 1 hour. The temperature is preferably at most 300° C., and the time is preferably at most 3 hours. Although higher temperatures and longer times can be applied, this is usually not attractive for economic reasons.

In order to further improve the properties of the hydrocarbonaceous binder, the composition of the present invention can contain conventional additives for increasing hardness, flexural strength and/or adhesion. Preferably, the composition according to the present invention comprises up to 3% by weight of iron and/or one or more iron containing compounds, based on amount of hydrocarbonaceous binder, more preferably from 0.001 to 1% by weight. Most preferably, the iron salt is iron oxide. The iron and/or iron compound can simultaneously act as pigment.

Further, radical forming compounds can be incorporated in a composition according to the present invention in order to accelerate hardening. Compounds which can be incorporated are polymers such as polyethene and (spent) catalyst fines.

The composition of the present invention can comprise further compounds to change the properties of the final product and/or to facilitate manufacture of the composition and/or final product. A non-exhaustive list of further compounds which can be present comprises heavy paraffins, sulphur, polyethylene, polypropylene, ethylene vinyl acetate, elastomers and polymers containing available epoxy groups as described in WO 96/28513.

The appearance of compositions of the present invention can be changed as desired for its application. In order to change the colour of the compositions, any of the conventional pigments can be used. In order to obtain a smoother surface, the surface of the compositions can be treated with a flame or the sizes of the solid particles can be adjusted, as known to someone skilled in the art. In order to improve the appearance of compositions, more specifically of construction elements, the surface can be treated with wax or wax like materials such as bees wax, petroleum wax, synthetic wax or silicones containing polish.

The composition of the present invention can be prepared in any suitable way. Optionally, the hydrocarbonaceous binder can be made into a suspension or emulsion which is subsequently mixed with the solid particles. Preferably the solid particles will be mixed with molten hydrocarbonaceous binder, e.g. a hydrocarbonaceous binder containing the required asphaltenes is melted, and mixed with either cold or warm solid particles, or hot solid particles are mixed with hot or cold hydrocarbonaceous binder. Additionally, a molten hydrocarbonaceous binder can be mixed with solid particles, and the required asphaltenes can be formed in-situ during thermal treatment of the mixture.

An advantageous method of preparing compositions or construction elements according to the present invention, comprises using the hydrocarbonaceous binder, optionally together with solid particles, in the form of binder containing particles, more specifally in the form of binder containing granulate or powder. Either none, part or all of the solid particles can be present in the binder containing particles. Binder containing particles are easy to use in transport and during manufacture. The use of binder containing particles is especially advantageous if the binder is relatively hard, i.e. has a relatively low penetration, in which case the particles will not stick together. Such binder containing particles can contain further additives such as pigments.

The composition of the present invention is especially suitable for use in construction, including building. Therefore, the present invention further relates to construction elements comprising composition according to the present invention. Composition according to the present invention is especially suitable to replace concrete. A construction element is a self-contained component of fixed dimensions, which is used in construction. Construction elements include building elements. Preferred construction elements are pipes, tiles, roof tiles, paving stones (pavers), flagstones, bricks, foundations, boards, gutters and/or conduits. Road surfaces, floors and roofs are not construction elements. Preferably, the construction element will have dimensions of at most 5 meters by at most 5 meters by at most 40 meters, more specifically dimensions of at most 1 meter by at most 1 meter by at most 2 meters. Preferably, the element will have dimensions of at most 1 meter by at most 1 meter by at most 0.5 meter. Most preferably, the element will have dimensions of at most 20 centimeter by at most 20 centimeter by at most 10 centimeter. The construction element preferably is a block. Compositions according to the present invention are especially suitable for use in paving stones in view of the good flexural strength of the compositions, especially the good flexural strength retained after having been exposed to water optionally containing salt and/or (strong) acid, more especially such exposure at elevated temperature.

Construction elements containing composition according to the present invention, have the further advantage that they can be recycled.

The present invention further relates to constructions, including buildings, comprising construction elements according to the present invention Due to their stability, the compositions and construction elements of the present invention are especially suitable for use outdoors.

In order to increase the load-carrying properties, the compositions can contain reinforcements such as steel bars, steel fabric, polymers, glass fibres, carbon fibres, carbon flakes and/or carbon fabric.

EXAMPLES

The flexural strength in all examples was measured according to NEN 7014 test of the "Nederlands Normalisatie Instituut", $2^{nd}$ edition, August, 1974.

The compression strength was measured according to ISO/R 836 of the European Federation of Manufacturers of Refractory Products as revised in 1990, PRE/R 14-1.

The void content was determined according to the "Standaard Regelgeving Advisering Wegenbouw", 1995, test 67.

The "Marshall method" applied has been described in "Standaard Regelgeving Advisering Wegenbouw", 1995, test 47 (pages 111–119) with the difference that the particle size distribution of each batch of solid particles was measured and the different batches were combined to obtain the desired particle size distribution, instead of separating the mineral aggregate into separate fractions.

The asphaltenes were separated off as described in IP 143/96.

The amount of aromatic carbon in the asphaltenes was determined by H and $^{13}$CNMR measurements.

The penetration was measured according to ASTM D 5 at 25° C.

Example 1

A hydrocarbonaceous binder was obtained by thermal cracking of a residual fraction of Middle East origin having a boiling point of 520° C. or more, and subsequently removing the light fractions by subjecting the product to vacuum flashing. The binder obtained would have a boiling point of 520° C. or more under atmospheric conditions.

The hydrocarbonaceous binder contained 24.9% by weight of asphaltenes. The asphaltenes had 64.6% by weight of carbon atoms in aromatic rings. The hydrocarbonaceous binder contained 75.1% by weight of further hydrocarbons. The hydrocarbonaceous binder had a penetration of 7 dmm.

The hydrocarbonaceous binder (7.68% by weight) was melted and heated to a temperature of 180° C. and mixed with 20.27% by weight of filler (particle size less than 63 micrometer), 39.86% by weight of sand (particle size, between 63 micrometers and 2 mm), and 39.87% by weight of stones (particle size between 4 and 8 mm, broken Dutch river gravel), all amounts based on total weight of solid particles. The mineral particles were preheated to a temperature of 180° C.

Mixing was carried out with a mixing apparatus ex Hobart for 3 minutes at 180° C.

1.1 kg of this mix having a temperature of 180° C. was placed in a preheated (180° C.) mould of 8 centimeter height and 10.5 centimeter diameter, and cylindrical blocks were prepared according to the Marshall method.

Discs of 8 mm thickness sawn from these cylindrical blocks, were used for testing.

The flexural strength of a disc was 7.4 N/mm$^2$. The voids content was 2.3%.

Further discs were aged by storing them in 1 M HCl or 1 M NaCl solutions for 1–9 weeks.

After 3 weeks in 1 M HCl solution at ambient temperature the flexural strength was 4.7 N/mm$^2$.

After 9 weeks in 1 M HCl solution at ambient temperature, the flexural strength was 4.3 N/mm$^2$.

After 1 week 1 M NaCl solution at 60° C., the flexural strength was 4.7 N/mm$^2$.

Example 2

Hydrocarbonaceous binder was mixed with the preheated mineral particles as described in Example 1 except that the mix had a temperature of 210° C.

Blocks were prepared as described in the Marshall method.

The flexural strenght was about 4 N/mm$^2$.

The compression strength of the blocks was 19 N/mm$^2$.

Example 3A 4 kg of the mix of hydrocarbonaceous binder and mineral particles prepared as described in example 1 and having a temperature of 180° C. was placed in a conventional cement concrete tile (flagstone) mould (200×200×80 mm), which mould was at ambient temperature. Tiles were prepared with a conventional tile production machine at a compaction time of 12 seconds.

The flexural strength of the tiles was 8.1 N/mm$^2$ and the void content was 2.4%.

Example 3B 4 kg of the mix of hydrocarbonaceous binder and mineral particles prepared as described in example 1 except that the mix had a temperature of 200° C., was placed in a conventional cement concrete paving stone (paver) mould (200× 100×80 mm) which mould was at ambient temperature. Paving stones were prepared with a conventinonal paving stone production machine at a compaction time of 12 seconds.

The flexural strength was 6.1 N/mm$^2$.

Example 3C

A paving stone, prepared as described in example 3B, was heated again to 200° C. and mixed and placed in a paving stone mould to again prepare a paving stone, according to the method described in example 3B. The flexural strength was found to be 6.3 N/mm$^2$.

This procedure was repeated again, resulting in a twice recycled paving stone with a flexural strength of 6.7 N/mm$^2$.

Example 4

Comparative

A bitumen binder was obtained by subjecting a crude oil of Middle East origin to distillation at atmospheric pressure, followed by subjecting the residue obtained to distillation under reduced pressure. The residue obtained after distillation under reduced pressure would have a boiling point of 520° C. or more under atmospheric conditions, and had a penetration of 80–100 dmm and a content of asphaltenes of 11%. The asphaltenes contained 53% of aromatic carbon. This binder was melted and used for preparing a mix at a temperature of 150–160° C. The mix contained 7.1% by weight filler, 36.8% by weight sand, 56.1% by weight stones and 5.8% by weight binder, all amounts based on total weight of solid particles.

1.1 kg of this mix was used for the preparation of cylindrical blocks by the Marshall method.

The flexural strength of a disc of 8 mm thickness sawn from the block, was 1.3 N/mm$^2$.

The compression strength of a block was 3.7 N/mm$^2$.

Example 5

Comparative

A bitumen binder was obtained by subjecting a crude oil of American origin to distillation at atmospheric pressure, followed by subjecting the residue obtained to distillation under reduced pressure. The residue obtained after distillation under reduced pressure would have a boiling point of 520° C. or more under atmospheric conditions, and had a penetration of 23 dmm and a content of asphaltenes of 11%. The asphaltenes contained 35% of aromatic carbons.

This binder was melted and used for preparation of a mix as described in example 1, except that the temperature of the mix was 170° C. 1.1 kg of this mix was used for the standard preparation of blocks according to the Marshall method.

The flexural strength of a disc of 8 mm thickness sawn from this block was 3.2 N/mm$^2$. The void content was 2.8%.

Example 6

Comparative

A crude oil of Middle East origin was subjected to distillation under atmospheric pressure, followed by subjecting the residue obtained to distillation under reduced pressure. The residue obtained after distillation under reduced pressure would have a boiling point of 520° C. or more under atmospheric pressure. This residue was subjected to extraction with propane. The binder obtained had a penetration of 7 dmm and had a content of asphaltenes of 13.2% by weight. The binder was melted and used for preparing a mix containing 7.1% by weight filler, 36.8% by weight sand, 56,1% by weight stones and 5.8% by weight of binder, all based on total amount of solid particles.

1.1 kg of this mix was used for preparing blocks according to the Marshall method. A block was used for compression strength measurement, giving a value of 11.6 N/mm$^2$.

Discs of 8 mm thickness sawn from these cylindrical blocks, were used for testing.

The flexural strength of a disc was 7.5 N/mm$^2$. The voids content was 5.6%.

Further discs were aged by storing them in 1 M HCl or 1 M NaCl solutions for 1–9 weeks.

After 3 weeks in 1 M HCl solution at ambient temperature the flexural strength was 2.9 N/mm$^2$.

After 1 week 1 M NaCl solution at 60° C., the flexural strength was 3 N/mm$^2$.

Example 7

Comparative 7.68% by weight of a binder as described in example 6, was mixed with 20.4% by weight filler, 40.11% by weight sand, and 39.5% by weight pure silica stones (4–8 mm), all based on total amount of solid particles.

1.1 kg of this mix was used for the preparation blocks according to the Marshall method.

A disc of 8 mm thickness was sawn from the block and was found to have a flexural strength of 7 N/mm$^2$ Another disc of 8 mm thickness was stored for 24 hours in seawater at a temperature of 60° C. after which the flexural strength was 3.7 N/mm$^2$.

Example 8

The hydrocarbonaceous binder as described in example 1, was used for preparation of the mix as described by example 7.

1.1 kg of this mix was used for preparation of blocks according to the Marshall method.

A disc of 8 mm thickness was sawn from the block. The disc had a flexural strength of 7 N/mm$^2$ and a void content of 1%. The compression strength of a block was 12.8 N/mm$^2$.

Another disc of 8 mm thickness was stored for 24 hours in seawater at a temperature of 60° C. after which the flexural strength was 6.4 N/mm$^2$.

Example 9

Comparative

A bitumen binder was obtained by subjecting a crude oil of American origin to distillation at atmospheric pressure, followed by subjecting the residue obtained to distillation under reduced pressure. The residue obtained after distillation under reduced pressure would have a boiling point of 520° C. or more under atmospheric conditions, and had a penetration of 6 dmm and a content of asphaltenes of 22%. The asphaltenes contained 53.6% of aromatic carbons. The binder was melted and used for preparation of a mix with a filler, sand and stones as described in example 1. 1.1 kg of this mix was used for preparing blocks according to the Marshall method.

A disc of 8 mm thickness was sawn from a block and had a flexural strength of 5.6 N/mm$^2$ and a voids content of 2.6%.

Example 10

Comparative

A bitumen binder was obtained by subjecting a crude oil of Far East origin to distillation under atmospheric pressure, followed by subjecting the residue obtained to distillation under reduced pressure. The residue obtained after distillation under reduced pressure would have a boiling point of 520° C. or more under atmospheric conditions, and had a penetration of 5 dmm, contained 10.3% by weight of asphaltenes. The asphaltenes contained 57.9% of aromatic carbon.

1.1 kg of the mix was melted and used for the preparation of blocks according to the Marshall method as described in example 1.

A disc of 8 mm thickness sawn from the block, had a flexural strength of 2.4 N/mm$^2$ and 3.3% voids.

Example 11

The hydrocarbonaceous binder as described in example 1, was used for preparing a mix containing 7.5% by weight binder, 7% by weight red powder (iron oxide), 15.15% by weight of filler 38.92% by weight of sand, and 38.93% by weight of stones, all based on total weight of solid particles described in example 1.

1.1 kg mix was used for the preparation of Marshall method.

A disc of 8 mm thickness was sawn from the block for flexural strength testing giving a value of 7.3 N/mm$^2$.

The disc had a voids content of 1.8%.

Example 12

The hydrocarbonaceous binder as described in example 1, was used for preparing a mix as described in example 1 in which the filler was replaced by red powder (20.27% by weight).

1.1 kg of mix was used for the preparation of blocks according to the Marshall method.

The flexural strength was about 4 N/mm2.

The compression strength was 20 N/mm2.

Example 13

The hydrocarbonaceous binder as described in example 1, was used for preparing a mix of 7.97% by weight hydrocarbonaceous binder, 37.6% recycled asphalt, 21% by weight of filler and 41.4% by weight of sand, all based on total weight of solid particles. The mix was prepared according to the procedure described in example 1.

1.1 kg of mix was used for the preparation of blocks according to the Marshall method.

A disc of 8 mm thickness was sawn from a block and had a flexural strength of 7.2 N/mm$^2$ and 1.2% voids.

Example 14

The hydrocarbonaceous binder described in example 1, was used for preparation of a mix having the following composition: 7.95% by weight hydrocarbonaceous binder, 17.4% graphite flakes, 41.3% by weight of sand, and 41.3% by weight of stones all based on total weight of solid particles. Mixed according to the procedure described in example 1, 1.1 kg of mix was used for the preparation of blocks according to the Marshall method.

A disc of 8 mm thickness was sawn from a block and had a flexural strength of 3.5 N/mm$^2$.

The electrical restitivity was 20Ω.

Example 15

The hydrocarbonaceous binder described in example 1, was used for preparation of a mix having the following composition: 7.8% by weight hydrocarbonaceous binder, 8.5%w graphite flakes, 10.29% by weight of filler, 40.61% by weight of sand, and 40.58% by weight of stones, all based on total weight of solid particles. Mixed according to the procedure described in example 1, 1.1 kg of mix was used for preparation of blocks according to the Marshall method.

A disc of 8 mm thickness sawn from a block, had a flexural strength of 6.2 N/mm2 and 3% voids.

The electrical restitivity was 200Ω.

Example 16

The hydrocarbonaceous binder as described in example 1, was used for preparation of a very open composition comprising 6.43% by weight binder, 5.8% by weight of filler, 10.13% by weight of sand and 84.07% by weight of stones, all based on total weight of solid particles. Mixed according to the procedure described in example 1, 1.1 kg of mix was used for the preparation of blocks according to the Marshall method.

The flexural strength was estimated to be 2 N/mm2.

The compression strength was 7.6 N/mm$^2$.

Example 17

Comparative

A hydrocarbonaceous binder was obtained by thermal cracking of a residual fraction of Middle East origin having a boiling point of 520° C. or more, and subsequently removing the light fractions by subjecting the product to vacuum flashing. The binder obtained would have a boiling point of 520° C. or more under atmospheric conditions.

The hydrocarbonaceous binder had a penetration of 47 dmm and contained 12.6% by weight of asphaltenes. The binder was used in the preparation of a mix as described in example 1.

1.1 kg of this mix was used for preparing blocks according to the Marshall method.

A disc of 8 mm thickness was sawn from a block. The flexural strength was 3.6 N/mm$^2$.

The compression strength of a block was 5.9 N/mm$^2$.

The Examples according to the invention show that compositions according to the present invention have a good flexural strength.

Comparison of Example 1 with Example 6 (comparative), and comparison of Example 7 (comparative) with Example 8, shows that compositions according to the present invention retain their flexural strength better after exposure to water containing NaCl and after exposure to water containing HCl, than compositions not according to the invention.

Examples 3B and 3C show that the flexural strength of compositions according to the present invention, increases by heat treatment.

What is claimed is:

1. Solid-state composition having a flexural strength of at least 0.5 N/mm$^2$, which composition comprises from 70 to 99% by weight of solid particles and from 30 to 1% by weight of a hydrocarbonaceous binder, which binder contains (i) from 15 to 95% by weight, based on total binder, of asphaltenes, which asphaltenes contain at least 60% aromatic carbon, and (ii) from 5 to 85% by weight, based on total binder, of further hydrocarbons, with the proviso that the solid particles are not solely carbon particles.

2. Composition according to claim 1, which composition has a flexural strength of at least 3 N/mm$^2$.

3. Composition according to claim 1, in which composition the hydrocarbonaceous binder has a penetration of at most 10 dmm.

4. Composition according to claim 1, which hydrocarbonaceous binder consists of product obtained by subjecting hydrocarbons to thermal cracking.

5. Composition according to claim 1, which hydrocarbonaceous binder consists of product obtained by pre-heating a hydrocarbon oil to a temperature of from 350 to 500° C., maintaining the pre-heated oil at such conditions as to cause thermal cracking and subsequently separating off one or more light fractions.

6. Composition according to claim 1, which composition comprises from 1 to 100% by weight of silica, based on amount of solid particles.

7. Process for preparing a solid-state composition according to claim 1, which process comprises mixing from 70 to 99% by weight of solid particles and from 30 to 1% by weight of molten hydrocarbonaceous binder, which binder contains (i) from 15 to 95% by weight, based on total binder, of asphaltenes, which asphaltenes contain at least 60% aromatic carbon, and (ii) from 5 to 85% by weight, based on total binder, of further hydrocarbons, and allowing the resulting mixture to solidify, with the proviso that the solid particles are not solely carbon particles.

8. Construction element comprising a composition according to claim 1.

9. Construction element according to claim 8, which element has dimensions of at most 1 meter by at most 1 meter by at most 2 meters.

10. Construction containing construction elements according to claim 8.

* * * * *